United States Patent Office 2,969,154
Patented Jan. 24, 1961

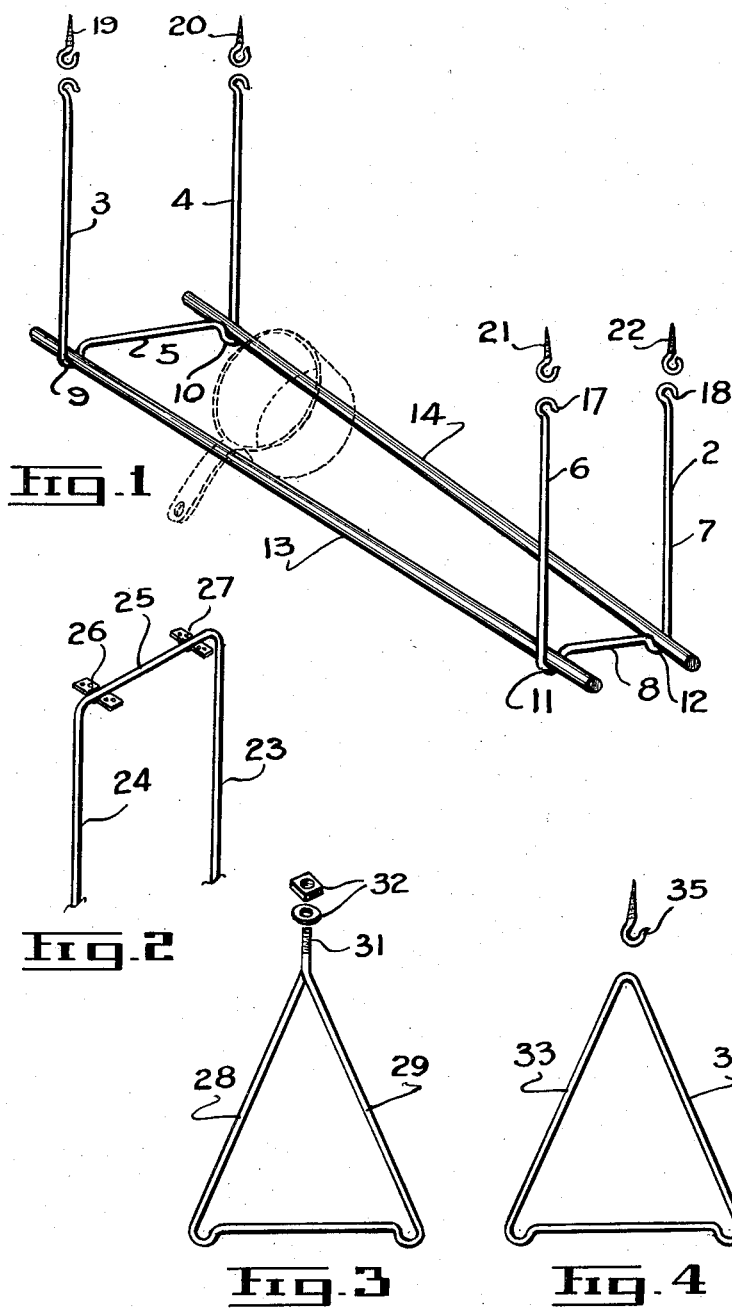

2,969,154

POT RACK

Joseph Edward Alfred Pelletier, Lewisville, New Brunswick, Canada (244 West Lane, Moncton, New Brunswick, Canada)

Filed Oct. 16, 1959, Ser. No. 846,849

3 Claims. (Cl. 211—71)

This invention relates to a pot rack, adapted to be used in a kitchen, on which pots and pans are neatly laid side by side and are prevented from striking each other.

The trend, in modern construction, is for more and more kitchen cupboard space but in most cases kitchen cupboards lack the facilities for neatly stacking or setting pots and pans in such a way that their highly polished surfaces are protected.

At present, housewives generally adopt one cupboard and stack highly polished stainless steel or aluminum pots and pans in such a way in this cupboard with the result that they quickly become scratched and dented which is in great contrast with their original appearance.

In order to overcome these objections the main object of this invention is to provide a pot rack having end supports between which are disposed a plurality of rods in angular relation to one another and a means of securing the end supports to the underside of the kitchen cupboards. A single tier rack is provided for small families when only a small number of pots and pans are required and a double tier rack may be provided to accommodate a larger number of pots and pans.

Other apparent objects are the provision of a pot rack which is strong and durable, easy to manufacture and install and of low manufacturing cost.

With these and other objects in view that may appear as the description of the pot rack proceeds, the invention consists in the novel arrangement, combination and construction of parts as hereinafter more specifically set forth and shown in the accompanying drawings.

Figure 1 is a perspective view of the pot rack.

Figure 2 is a modification of the end support for the pot rack.

Figure 3 is another modification of the end support for the pot rack.

Figure 4 is a view in elevation of another modification of an end support for the pot rack.

Referring to Figure 1 the pot rack consists of end supports 1 and 2, on which are supported rods 3 and 4.

The end supports 1 and 2 are formed of heavy wire and are shown U-shaped as in Figure 1. End support 1 consists of vertical parts 3 and 4 and a horizontal part 5, and end support 2 consists of vertical parts 6 and 7 and a horizontal part 8. Grooves 9, 10, 11, and 12 are shown in Figure 1 at the bottom of vertical parts 3, 4, 6 and 7. The horizontal part 8 of the end support 2 is of less length than the horizontal part 5 of the end support 1. Rods 13 and 14 are shown supported in the grooves 9, 10, 11, and 12 of the end supports 1 and 2. On account of the part 8 being of less length than the part 5, the rods 13 and 14 converge from the end support 1 to the end support 2. The purpose of this spacing of the rods 13 and 14 is for supporting different sizes of pots and pans on the rack.

The upper ends of the vertical parts 3, 4, 6 and 7 are formed with hooks 15, 16, 17 and 18 for supporting the pot rack on screw threaded hooks 19, 20, 21 and 22 placed underneath the kitchen cupboard desired.

Figure 2 shows a modification of the end supports for the pot rack in which the upper ends of the vertical parts 23 and 24 are joined together with a horizontal part 25. The end supports are fastened underneath the cupboard by brackets 26 and 27.

Further modifications are shown in Figures 3 and 4 in which the end supports are formed triangular in shape. The two sides 28 and 29 in Figure 3 contact each other at 30 with the side 29 being extended vertically and screw threaded at 31 to cooperate with a nut and washer 32 for fastening below the kitchen cupboard.

In Figure 4 the two sides 33 and 34 contact each other and are welded together or fastened by other suitable means. A screw threaded hook 35 is shown for supporting the end supports of the pot rack from beneath the kitchen cupboard or other desired place.

In all the modifications of end supports of the pot rack and their methods of attachment to the under-surface of kitchen cupboards, the rods are supported horizontally with each pair of rods 13 and 14 for supporting the pots and pans diverging or converging towards one another. Any length of rods may be used.

In Figure 1 is illustrated in dotted lines how a pot is supported over the rods 13 and 14.

While the invention has been shown and described with reference to specific embodiments it is understood that it is not to be limited thereto but is to be construed broadly and limited only by the scope of the claims.

The embodiments of the invention in which an exclusive property or privilege is claimed are as follows:

I claim:

1. A rack for pots and pans comprising a pair of spaced hangers adapted to be suspended from a support, said hangers having parallel cross bars with the cross bar of one hanger being of greater length than the cross bar of the other hanger, the ends of said cross bars being off-set downwardly to define grooves and rods extending between said hangers disposed in the grooves of said cross bars.

2. A rack for pots and pans comprising a pair of spaced hangers adapted to be suspended from a support, said hangers having parallel cross bars with downwardly off-set portions defining spaced apart grooves, the grooves of one cross bar being spaced apart a greater distance than the grooves of the other cross bar, and rods extending between said hangers disposed in the grooves of said cross bars.

3. A rack for pots and pans comprising a pair of spaced hangers, each hanger having a pair of legs for suspending the hanger from a support, a cross bar connecting the legs of said hangers having downwardly offset portions at its jointure with said legs to define grooves, said cross bars being disposed in parallel relation with the cross bar of one hanger being of greater length than the cross bar of the other hanger and rods extending between said hangers and seated in the grooves of said cross bars.

References Cited in the file of this patent

UNITED STATES PATENTS

| 1,066,371 | Bosworth | July 1, 1913 |
| 2,458,332 | Boschan | Jan. 4, 1949 |
| 2,645,357 | Taylor | July 14, 1953 |

FOREIGN PATENTS

| 687,213 | Great Britain | Feb. 11, 1953 |